Jan. 30, 1962  Z. TAKATS ET AL  3,018,709
CAMERA FILM FEEDING, CUTTING AND STORING APPARATUS
Filed Sept. 22, 1958  4 Sheets-Sheet 1

INVENTORS
ZOLTAN TAKATS
CARL H. JACOBSON

BY

ATTORNEYS

INVENTORS
ZOLTAN TAKATS
CARL H. JACOBSON
ATTORNEYS

Jan. 30, 1962    Z. TAKATS ET AL    3,018,709
CAMERA FILM FEEDING, CUTTING AND STORING APPARATUS
Filed Sept. 22, 1958    4 Sheets-Sheet 4

INVENTORS
ZOLTAN TAKATS
CARL H. JACOBSON
ATTORNEYS

United States Patent Office 3,018,709
Patented Jan. 30, 1962

3,018,709
CAMERA FILM FEEDING, CUTTING AND STORING APPARATUS
Zoltan Takats, Vestal, and Carl H. Jacobson, Binghamton, N.Y., assignors to General Aniline & Film Corporation, New York, N.Y., a corporation of Delaware
Filed Sept. 22, 1958, Ser. No. 762,514
13 Claims. (Cl. 95—31)

This invention relates to an apparatus primarily adapted for use with cameras whereby photographic film is fed through the camera where it is exposed, cut into sheets, and stored ready for developing. More particularly, this invention relates to a feeding, cutting, and storing mechanism which can be used in combination with an aerial camera which mechanism operates automatically without the aid of the pilot or other operator.

It is well known that an aircraft used for aerial photographic reconnaissance has to return to its home base in order to have the pictures, taken during a flight, developed. In highly mobile warfare, it is vital that no valuable time be lost and these pictures be made available for inspection and evaluation without undue delay. Also, in some instances pictures taken during a flight are not as good as desired and a retake becomes necessary and it is of utmost importance that this be known in the shortest possible time, preferably while the airplane is still in flight.

In accordance with the invention, the aerial photographic apparatus enables immediate development of the pictures taken by the camera while the plane is in flight so that they may be examined and evaluated by the pilot or any other person on board the plane. The time lag between the taking of the picture and the subsequent development thereof is compensated by the novel arrangement of cutting the continuous strip of film into individual sections and storing the cut sections for processing apparatus.

It is an object of this invention to provide an apparatus in coaction with a camera which automatically feeds a continuous strip of film through the camera to be exposed therein, cuts the exposed film into sections and stores the cut sections until each is developed in the sequential order of the exposures.

It is a further object of this invention to provide a novel feeding means which can be combined with a camera for automatically feeding photographic film therethrough.

It is a still further object of this invention to provide a novel cutting and guiding means for guiding a continuous film into a storage hopper and cutting the film into sections of desired size to be stored in the hopper.

It is another object of this invention to provide a novel hopper and operating means therefor for storing cut film.

It is still another object of this invention to provide an apparatus for feeding, cutting and storing photographic film which is of compact construction and light in weight so it can be mounted in an airplane.

Other objects and features will be apparent from the following description of the invention, pointed out in particularity in the appended claims and taken in connection with the accompanying drawings, in which:

Film feeding mechanism

Figure 1:
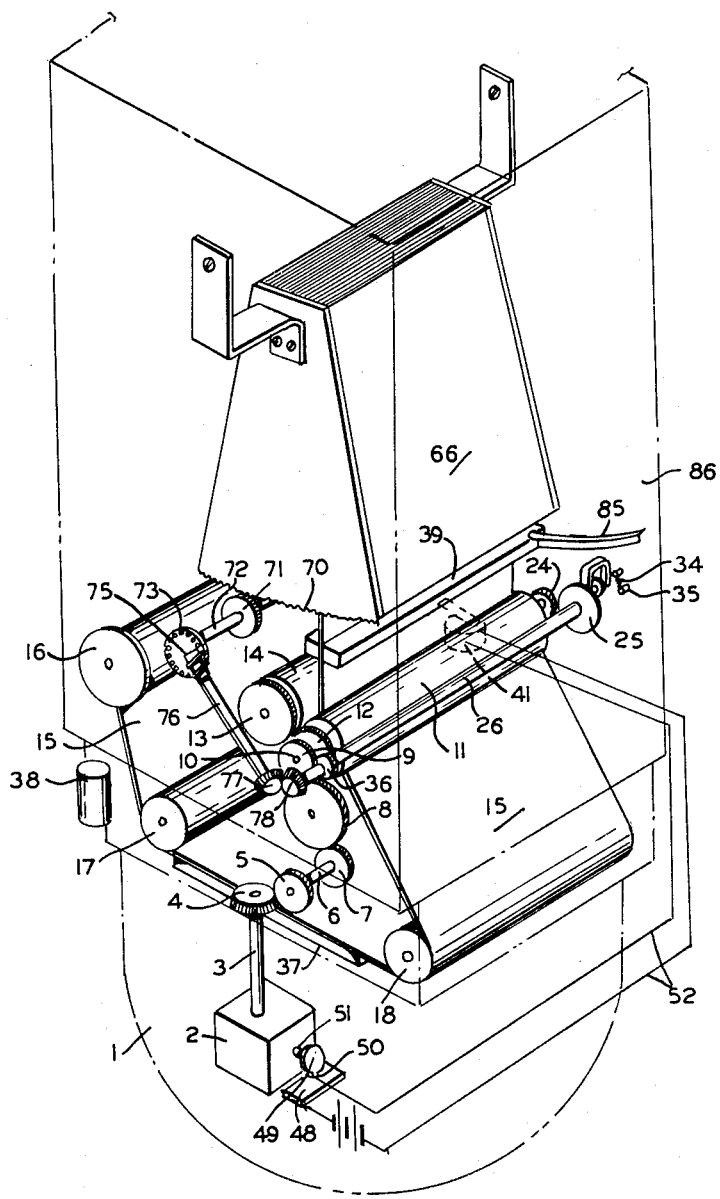
FIG. 1 is a perspective schematic view of the novel apparatus of this invention.

As shown in FIG. 1, the novel apparatus includes a camera 1 in which is housed an electric motor 2 for driving certain movable parts of the novel apparatus. The camera proper may be any suitable camera such as an aerial camera. The shaft 3 of the motor is provided with a bevel gear 4 meshing with a bevel gear 5 mounted on shaft 6 provided on the other end thereof with a gear 7 meshing with gear 8 which in turn meshes with gear 9 mounted on a shaft 10 whereby the shaft 10 is rotated by motor 2. Loosely mounted on shaft 10 is a roll 11. The roll 11 carries a gear 12 meshing with gear 13 mounted on roll 14. The rolls 11 and 14 are positioned adjacent each other and serve to intermittently move the film 15, which is stored on a roll 16, under idler roll 17 past the lens of the camera then under idler roll 18 to the cutting station and into the hopper.

Figure 5:
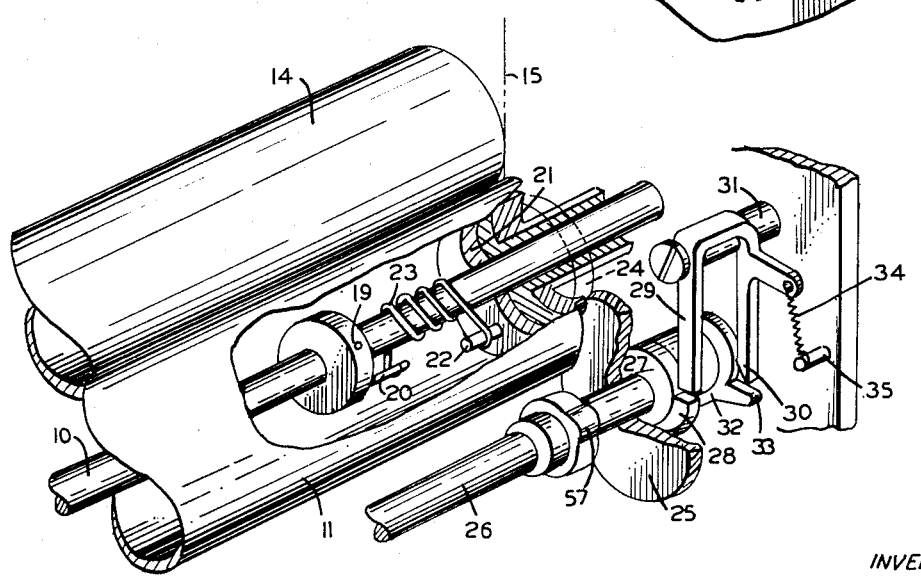
FIG. 5 is a detail view partly in section of one end of the feed rolls showing the means for causing intermittent rotation thereof.

In FIG. 5 is shown in detail the structure used for intermittently rotating roll 11. As shown in this figure, the shaft 10 has pinned thereto, adjacent its end opposite the end carrying gear 9, a collar 19 which has a pin 20 projecting therefrom. A bushing 21 is rigidly secured to roll 11. This bushing is provided with a pin 22 projecting therefrom toward pin 20 on the collar 19. The shaft 10 passes freely through this bushing. A spring 23 is loosely coiled about shaft 10 with one end of the spring secured to pin 20 and the other end secured to pin 22. The shaft 10 with collar 19 is continuously rotated by gear 9. This causes a tensioning of spring 23. When the tension of the spring reaches a predetermined point, it causes a rapid rotation of the roll 11 fixed to the bushing 21 and an overriding of the shaft 10 until the tension of the spring is relieved. Rotation of roll 11 causes a rotation of roll 14 through gears 12 and 13. The rotation of rolls 11 and 14 moves the film 15 as indicated above.

To bring the roll 11 to an abrupt stop after the tension on spring 23 has been relieved, a gear 24 is rigidly secured to roll 11 and bushing 20. The gear 24 meshes with a gear 25 loosely mounted on a continuously rotating shaft 26. Also loosely mounted on shaft 26 and rigidly connected to gear 25 is a cam 27 having a tooth 28. This cam cooperates with a pawl 29 rigidly connected with a lever 30. Pawl 29 and lever 30 form a U-shaped element which is pivotally mounted on a pin 31 extending from the supporting frame of the apparatus. The lever 30 cooperates with a cam 32 provided with a high spot 33 and rigidly mounted on shaft 26. The pawl 29 and lever 30 are maintained in contact with their respective cams 27 and 32 by means of a spring 34, one end of which is secured to lever 30 and the other end of which is secured to a pin 35 extending from the frame of the machine. Upon continuous rotation of shaft 26 carrying cam 32 therewith, the high point 33 of this cam periodically swings the lever 30 outwardly on its pivot, which lever carries the pawl 29 away from cam 27, thereby releasing this cam 27 and gear 25 enabling this gear and cam to be rotated by gear 24 on roll 11. When the high point 33 of cam 32 moves away from lever 30, both the lever 30 and pawl 29 are moved back to the position shown in FIG. 5, by spring 34 whereby the pawl 29 stops the rotation of cam 27 by engagement with tooth 28, thereby stopping the rotation of gears 25 and 24 and roll 11. The shaft 26 is rotated by means of gear 36 (FIG. 1) meshing with gear 9.

Vacuum means 37 (FIG. 1) are provided adjacent the edges of the portion of the film 15 opposite the lens to keep the film against the camera and to prevent the film from buckling. A vacuum tank 38 is connected to vacuum means 37.

Cutting and guiding mechanism

Figure 2:
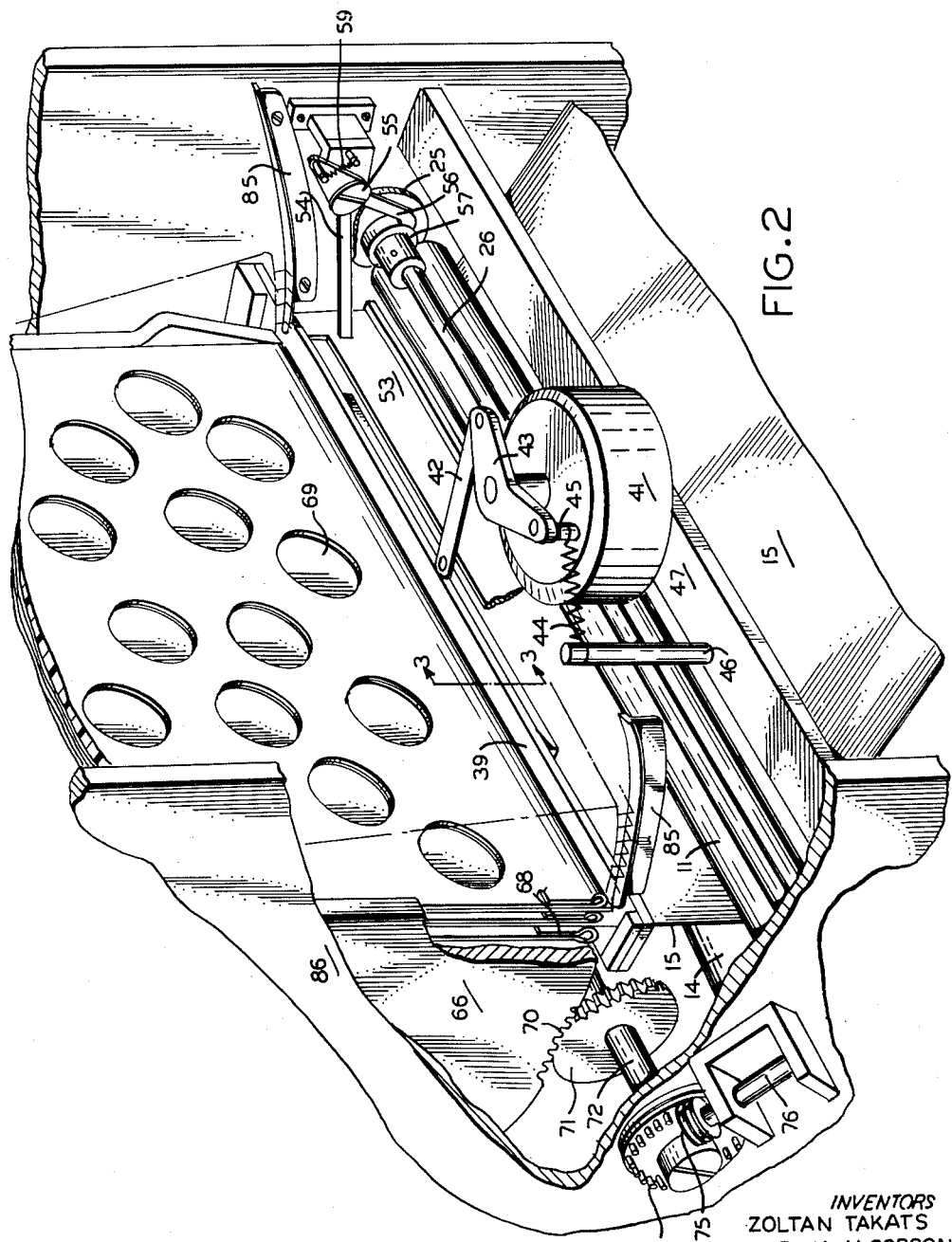
FIG. 2 is an enlarged perspective view partly in section illustrating the knife station and portions of the storage unit.
Figure 3:
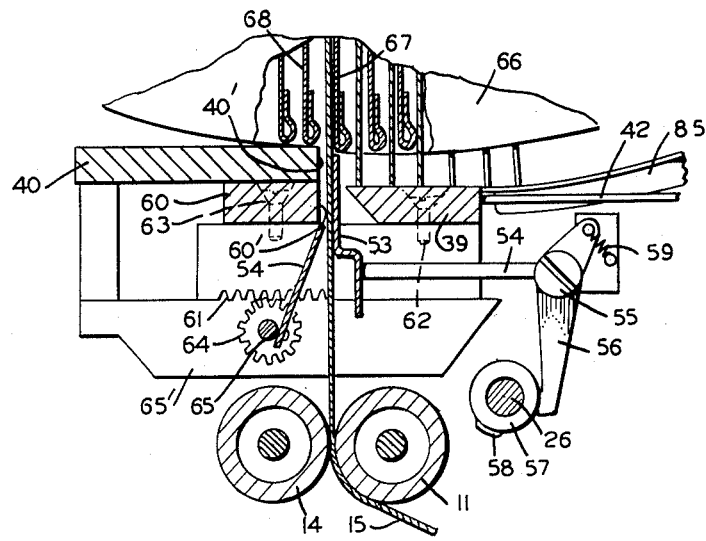
FIG. 3 is a sectional view taken along the line 3—3, FIG. 2 showing the knife in normal position.
Figure 4:
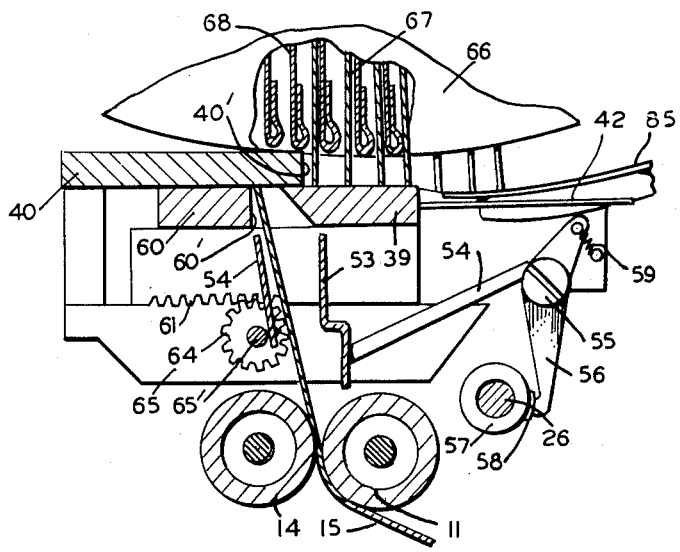
FIG. 4 is a sectional view similar to FIG. 3 but showing the knife in the cutting position.

The cutting and guiding mechanism for the film as shown in FIGS. 3 and 4 comprises a movable knife 39 and a stationary knife 40. The movable knife is moved to cutting position by means of a solenoid 41 (FIGS. 1 and 2) connected to knife 39 by means of arm 42 and lever 43 and is moved to inoperative position by means of spring 44 having one end attached to pin 45 on lever 43 and the other end attached to a pin 46 projecting from bracket 47 upon which the solenoid is mounted. The operation of the solenoid is controlled by a microswitch 48 operated by cam 49 having high point 50 on shaft 51 driven by motor 2. The switch 48 is electrically connected to solenoid 42 by leads 52.

As shown in FIGS. 3 and 4, guide elements 53 and 54 are provided for guiding the film into the hopper. Guide element 53 when in operative position lies in the path of movement of the knife 39 and before the knife can move to cutting positon, this guide has to be moved downwardly. In order to accomplish this, the guide 53 is mounted on arm 54 which is attached to a pivoted stud 55. Rigidly attached to the stud 55 is a lever 56, one end of which rides on a cam 57 mounted on shaft 26. When the high point 58 of cam 57 contacts lever 56, it moves this lever to the right (FIG. 3) thereby rotating stud 55 counterclockwise and moving arm 54 and guide 53 downwardly to the position shown in FIG. 4. A spring 59 has one end attached to the other end of lever 56, the other end of the spring being attached to the frame of the machine to keep the first mentioned end of lever 56 in contact with the cam and to move the arm 54 and guide 53 from the position shown in FIG. 4 back to the position shown in FIG. 3.

A plate 60 extends in spaced parallel relation to knife 39 forming a passageway between the knife and plate through which passageway the film 15 passes as it enters the hopper. Both the knife and plate are attached to a rack plate 61 by screws 62 and 63, respectively. The rack plate meshes with a pinion 64 mounted on a shaft 65 journalled in side plates 65'. The guide 54 is rigidly attached to pinion 64 and moves therewith. As the knife 39 is moved to cutting position, the plate 60 and rack 61 move with it. Movement of rack 61 actuates pinion 64 to move guide 54 from the position shown in FIG. 3 to the position shown in FIG. 4. The plate 60 and guide 54 provide a support for the portion of the cut film below the knife to prevent the film from crimping. Upon return movement of the knife, the rack moves the pinion 64 and guide 54 back to the position shown in FIG. 3 thereby once more aligning the film with a pocket in the hopper. The guides 53 and 54, the edge 60' of plate 60 and the edge 40' of stationary knife 40 all cooperate to insure proper alignment of the film with a pocket in the hopper.

Hopper and operating mechanism therefor

The hopper 66 is mounted to oscillate above movable knife 39 and stationary knife 40. The hopper is subdivided into a plurality of pockets 67 by means of a plurality of partitions 68 as shown in FIGS. 2, 3 and 4. Each partition 68 is provided with cut-out portions 69 to minimize the area of contact between the film and partition, thereby minimizing friction between the film and partition and preventing formation of a vacuum between the film and partition.

Figure 6:
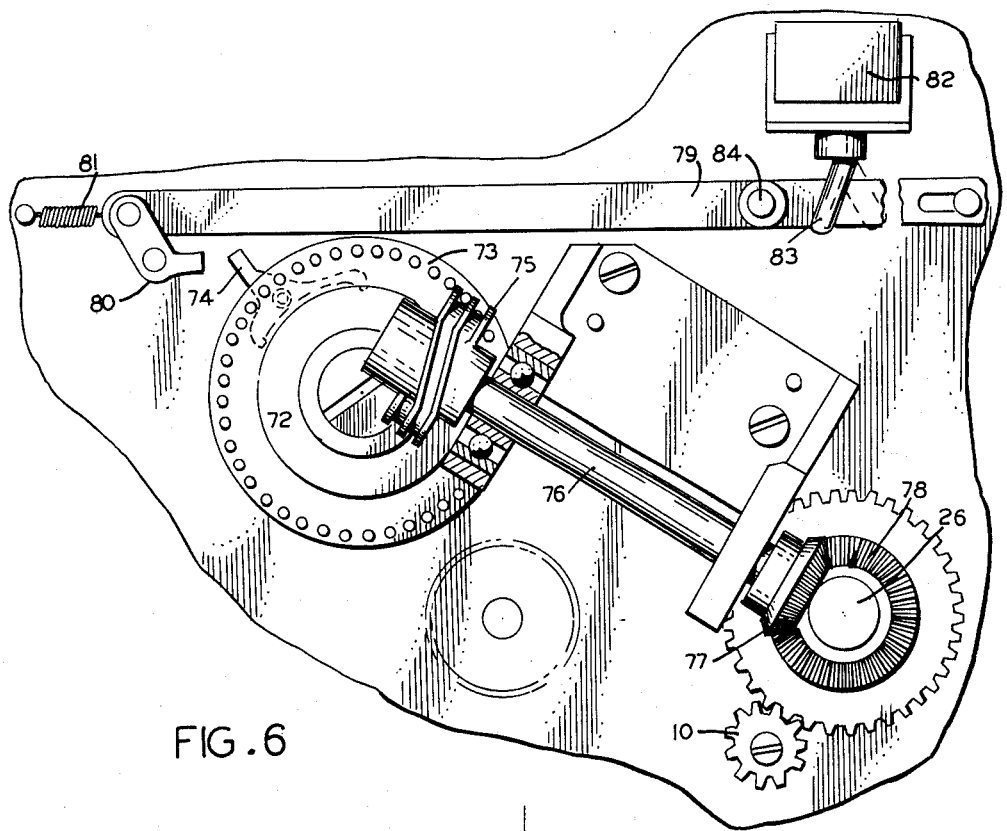
FIG. 6 is a detail view on a larger scale showing the elements used to move the hopper stepwise.

The lower ends of two opposite walls of the hopper 66 are arcuate in shape and are provided with teeth to form racks 70. One of these racks is shown in FIGS. 1 and 2 as meshing with spur gear 71 pinned on a shaft 72. One end of this shaft carries an intermittent gear 73 loosely mounted thereon, but which gear may be locked to the shaft by a pawl 74 forming a clutch. The intermittent gear 73 meshes with a worm gear 75 rigidly secured to one end of a shaft 76. The other end of this shaft has a bevel gear 77 pinned thereto. Bevel gear 77 meshes with bevel gear 78 mounted on one end of shaft 26 (FIGS. 1 and 6). Rotation of shaft 26 causes rotation of shaft 76 and worm gear 75 and the actuation of the intermittent gear 73 thereby causing an indexing of the hopper in one direction to bring each pocket successively into alignment with guides 53, 54 to permit the film 15 to enter the pocket.

When the hopper has been moved in one direction as described above to the limit of its movement in said direction, that is, when all of the pockets have been filled, it operates a cut-off switch (not shown) to cut off the current to motor 2 thereby stopping the machine. The hopper may be reset or moved to its original position manually. This can be accomplished by disconnecting intermittent gear 73 from its shaft 72. For this purpose, there is provided a slidable lever 79 having at one end a pawl 80 which is positioned when the lever is moved to the right as shown in FIG. 6, to contact the pawl 74 to disconnect the intermittent gear 73 from its shaft 72. A spring 81 having one end connected to lever 79 and the other end connected to the frame of the machine maintains lever 79 and pawl 80 in their normal inoperative positions.

A safety-switch 82 is positioned adjacent the lever 79 for cutting off the power to the apparatus to stop the operation thereof. The safety-switch is provided with a button 83 adapted to be contacted by a stud 84 attached to lever 79 when the latter is moved to the right (FIG. 6).

Operation

In operating the novel apparatus as described above, a roll of film 16 is placed in the camera on supports provided therefor in the position shown in FIG. 1. The film 15 of roll 16 is then threaded manually by passing it under idler roll 18, past the lens of the camera and under and partly around idler roll 17, thence between rollers 11 and 14, between guiding means 53 and 54 and into a pocket 67 of hopper 66. The apparatus is now ready for automatic operation.

When it is desired to operate the apparatus, the motor 2 is energized by throwing the usual switch (not shown). Energization of the motor causes rotation of shaft 3 which by the system of gearing already described causes intermittent rotation of the film advancing rolls 12 and 14 to intermittently pull the film 15 from roll 16 past the camera lens and advance it into the hopper. The various parts of the apparatus are so proportioned that the interval of time the rolls 12 and 14 remain stationary is of sufficient duration to permit the portion of the film opposite the lens to be exposed, the knife 39 to be actuated to cut the film and the hopper to be advanced a distance equal to the width of one pocket 67. The interval of time that rolls 12 and 14 are rotated to advance the film is sufficient to remove the exposed portion of the film from opposite the lens and bring a fresh portion of unexposed film opposite the lens to be exposed upon the next opening of the shutter of the camera.

The knife 39 is actuated in timed relation to the actuation of the advancing rolls 11 and 14 by the microswitch 48 actuated by cam 49 driven by motor 2 which microswitch 48 controls the flow of electric current to the knife actuating solenoid 41. The movement of guide 53 and the indexing of the hopper 66 is timed with respect to the movement of the film and knife by means of shaft 26 which is rotated by motor 2, shaft 3 and the train of gearing already described. All movable parts of the apparatus are thus operated in timed relation with respect to each other automatically without the aid of an operator.

As shown in FIGS. 3 and 4, the portions of the cut film within the pockets 67 of the hopper are initially supported on the upper surface of knife 39. Stationary arcuate supports 85 are located below the two opposite walls of the hopper forming the racks 70 to support the cut portions of the film within the pockets 67 after the filled pockets are moved beyond the knife 40.

The hopper disclosed contains 52 pockets, though this number may be varied as desired.

The parts of our apparatus located outside the camera are enclosed within a light-proof casing 86 attached to the back of the camera and cooperating with the camera to prevent leakage of light to the film before and after it is exposed and moved into the hopper.

Our invention is not limited to the detailed description given above, but includes all modifications that fall within the scope of the appended claims.

We claim:

1. An apparatus of the class described comprising in combination a camera, storage means for storing photographic film after it has been exposed comprising a hopper having a plurality of individual pockets therein and an opening at one end, means for intermittently advancing a continuous strip of photographic film from a roll thereof through said camera and past the lens thereof, where it is exposed, and deposited into said hopper, cutting means adjacent said hopper for severing the portion of the film therewithin from the remainder of the film, means for advancing said hopper step by step to align the opening of each pocket thereof successively with the cut end of said film and means cooperating with said camera to form a light-proof enclosure for said hopper, and means to prevent leakage of light to said film before and after exposure thereof and while stored in said hopper.

2. Apparatus in accordance with claim 1 wherein said cutting means comprises a stationary knife and a movable knife, normally spaced from each other and means for moving the movable knife into cutting relation with said stationary knife to cut said film, and guiding means comprising a movable element normally positioned in the space between the knives and in the path of movement of said movable knife just prior to the beginning of the movement of the movable knife to cutting position.

3. An apparatus as recited in claim 1 including operating means for operating said advancing means, said cutting means and said means for advancing said hopper in timed relation to each other.

4. An apparatus as recited in claim 1 wherein the means for moving the movable knife includes a solenoid and timing means including a microswitch for timing the energization of said solenoid.

5. An apparatus of the class described comprising a camera, a vertically disposed storage hopper spaced above the back of the camera and mounted for oscillation, said hopper being formed with a plurality of pockets opening in the lower end thereof, means in the camera for supporting a roll of photographic film, moving means for intermittently moving the film from the roll through the camera past the lens thereof and into a pocket of the hopper, said last named means comprising idler rollers positioned on opposite sides of the lens and driven rolls positioned in the space between the back of the camera and the hopper, means for driving said driven rollers intermittently, guiding means positioned between said driven rolls and said hopper for guiding the film into a pocket of the hopper, said guiding means comprising a pair of movable elements forming a passageway therebetween, cutting means comprising a stationary knife and a movable knife normally spaced from each other to permit the film to move into a pocket of the hopper, said cutting means being positioned between said driven rolls and said hopper, means for moving said movable knife, one of said movable elements of said guiding means being normally positioned in the path of movement of said movable knife, means for imparting a step by step rotary movement to the hopper to bring each pocket therein in succession into alignment with said passageway, means for moving said one movable element out of the path of movement of said movable knife prior to movement thereof, means for timing the operation of all of said moving means, whereby the portion of the film opposite the lens is exposed, the one movable element is moved out of the path of movement of the movable knife, the movable knife is moved against the stationary knife to cut a previously exposed portion of the film disposed in a pocket of the hopper from the remainder of the film, the hopper is moved to bring the next adjacent pocket into position of alignment with the passageway and the movable knife and movable element are returned to their normal positions, all while the film remains stationary and, thereafter, the driven rolls operate to move the exposed portion of the film away from the lens, bring an unexposed portion of the film opposite the lens and move a previously exposed portion of the film into the pocket of the hopper which is in alignment with the passageway, and means cooperating with the camera for forming a light-proof enclosure about the film to prevent leakage of light to the film.

6. An apparatus as recited in claim 5 including vacuum means positioned in the camera adjacent the edges of the film for holding the film against the camera and for preventing buckling of the film.

7. An apparatus as recited in claim 5 wherein the lower ends of two opposite walls of the hopper are arcuate in shape and are provided with teeth to form racks and the means for imparting rotary movement to the hopper includes spur gears meshing with the racks, an intermittent gear for rotating the spur gears and means for disconnecting the intermittent gear from the spur gears.

8. An apparatus as recited in claim 7 including supports positioned below the racks at one side of the normal position of the movable knife in the direction of the step by step movement of the hopper to support the film disposed in the pockets of the hopper after the pockets of the hopper move beyond the normal position of the movable knife, the film in the pockets being supported by the upper surface of the movable knife immediately after the cutting of the film.

9. An apparatus as recited in claim 5 wherein the other of said movable elements of said guiding means is operatively connected to said movable knife and moves therewith, whereby upon movement of the movable knife to cutting position said last mentioned movable element is moved out of guiding position and upon the movement of the movable knife back to its normal position the said last mentioned movable element is returned to guiding position and aligns the cut end of the remainder of the film with a pocket in the hopper.

10. An apparatus for moving cutting and storing film which comprises a pair of parallel driven rollers positioned to engage the film therebetween and to advance a continuous strip of film from a roll thereof, upon rotation of said rollers, a hopper having a plurality of individual pockets opening toward said rollers positioned in spaced relation to said rollers, said hopper being mounted for oscillation, guiding and cutting means positioned in the space between the hopper and rollers, said guiding and cutting means including a stationary knife, a movable knife normally spaced from the stationary knife to permit the film to pass therebetween, a pair of movable spaced guiding elments normally forming a passageway therebetween below the knives, one of said elements being operatively connected to the movable knife to move therewith to and from normal guiding position, the other of said elements extending beyond said one element into the path of movement of the movable knife, means for intermittently driving said driven rollers, means for imparting stepwise rotary movement to said hopper to bring each pocket therein in succession into alignment with said passageway to receive a portion of the film, means for moving said other element out of the path of movement of the movable knife, means for moving the movable knife toward the stationary knife to cut said film and means for operating all of said moving means in timed relation to each other, whereby the driven rollers are first rotated to advance the leading portion of the continuous film into a pocket of the hopper and thereafter the rotation of the rollers is stopped, and while said rollers are stationary said other movable element is moved out of the path of movement of the movable knife, the movable knife is moved toward the stationary knife to cut the film, the movable knife returned to its normal position and said movable guiding elements returned to their normal guiding position thereby moving the leading edge of the remainder of the film which has moved out of alignment with the pocket in the hopper during the cutting operation back into alignment with a pocket in the hopper and the hopper is advanced to bring the next succeeding pocket into alignment with said passageway and the edge of the film to bring the pocket into position to receive the next portion of the film.

11. An apparatus as recited in claim 10 wherein the means for imparting stepwise rotary movement to the hopper comprises a rack on each of two opposite walls of the hopper, spur gears meshing with said racks, an intermittent gear and clutch means connecting said intermittent gear with said spur gears.

12. An apparatus as recited in claim 10 wherein the means for driving the movable knife includes a solenoid and an arm extending from the solenoid to the movable knife.

13. An apparatus as recited in claim 10 wherein the means for intermittently driving said driven rollers comprises a continuously rotatable shaft, one of said rollers being loosely mounted on said shaft, a spring loosely coiled about said shaft, one end of the spring being secured to said shaft and the other end of said spring being secured to said one roller whereby upon continuous rotation of the shaft the tension of said spring increases and causes rotation of said one roller and an overrunning of said one roller on said shaft to release the tension of the spring, a gear secured to one end of said one roller, a second continuously rotating shaft positioned outside of and adjacent said one roller, two adjacent cams mounted on said second shaft, one of said cams being rigidly secured to said second shaft and the other cam being loosely mounted on said second shaft, a pivoted U-shaped follower for said cams, the legs of the follower being positioned to cooperate with both of said cams, said loosely mounted cam having a tooth and a gear rigid therewith, said last named gear meshing with said first named gear, whereby upon the continuous rotation of the second shaft, the high point of the cam rigidly secured to the second shaft pivots the follower to move the leg thereof cooperating with the cam loosely mounted on said second shaft away from said cam permitting said cam and the gear rigid therewith to rotate and when the leg of the follower rides off the high point of its cam, the other leg comes in contact with said tooth to stop the rotation of its cam and the gear rigidly attached thereto thereby stopping the rotation of the roller.

References Cited in the file of this patent

UNITED STATES PATENTS

| | | |
|---|---|---|
| 1,494,665 | Clark | May 20, 1924 |
| 2,420,046 | Loeb | May 6, 1947 |
| 2,474,159 | Pejois | June 21, 1949 |
| 2,762,255 | Anderson | Sept. 11, 1956 |
| 2,788,703 | Holman | Apr. 16, 1957 |

FOREIGN PATENTS

| | | |
|---|---|---|
| 782,236 | Great Britain | Sept. 4, 1954 |